Patented Oct. 3, 1922.

1,430,724

UNITED STATES PATENT OFFICE.

ALEXANDER L. DUVAL D'ADRIAN, OF WASHINGTON, PENNSYLVANIA, ASSIGNOR TO A. L. DUVAL D'ADRIAN CHEMICAL COMPANY, OF ALTON, ILLINOIS, A CORPORATION OF ILLINOIS.

ARTICLE OF FUSED METALLIC OXIDE AND PROCESS OF PRODUCING THE SAME.

No Drawing.     Application filed February 25, 1921.     Serial No. 447,805.

*To all whom it may concern:*

Be it known that I, ALEXANDER L. DUVAL D'ADRIAN, a citizen of the Republic of France, and a resident of the city of Washington, county of Washington, and State of Pennsylvania, have invented certain new and useful Improvements in Articles of Fused Metallic Oxide and Processes of Producing the Same, of which the following is a description.

This invention relates to articles of fused metallic oxide and the process of producing the same, and has for its primary object to provide tubes, crucibles, blocks, muffles, etc., of high refractory and chemical resisting qualities, and which may be suddenly heated to a relatively high degree without deleterious results.

In the production of articles having the above noted characteristics, I have evolved an efficient process of fusing together metal oxide particles, such as the oxides of zirconium, thorium, tantalum, etc., whereby there is produced an article possessing highly refractory properties.

With the above and other objects in view, the present invention consists in an improved article, as heretofore characterized, and in the process of making such article as will be presently described in detail, and subsequently incorporated in the subjoined claims.

In carrying out my invention in practice the metallic oxide, preferably zirconium-oxide, is finely ground or comminuted, and to a predetermined quantity of the ground oxide a suitable binder, such as starch or molasses is added, so as to hold the particles by adhesion in the form of a conglomerate mass. It is desirable to use as little binder as possible in order that there may be a minimum of impurities present in the mass. In some cases the use of the binder may be dispensed with and the ground oxide simply moistened and subjected to hydraulic pressure to mold the material into the desired shape or form. When the binder is used the oxide mass is subjected to pressure in a suitable mold, and thereby compressed into the shape desired.

The molded article is now dried carefully, and the temperature thereof brought to such a heat that an electric current can be passed or conducted through the article. Preferably, in practice I have found that the desired electrical conductivity is attained when the article is heated to a red heat. The article is fastened between two spaced carbon electrodes or other electrical conductors, and is heated to a dull red heat by means of a muffle furnace or electrical resistance. When the article has been brought to a red heat, the oxide is capable of conducting an electric current. A current is then passed through the article between the electrodes, of high enough voltage and amperage to bring the article, by resistance to the current to a temperature above 2500° C. This temperature is so that the parts of zirconium-oxide fuse together. The amount of current requisite to cause such fusion will depend upon the length and cross sectional area of the article which determines the resistance offered to the passage of the electric current.

In order to prevent the loss of heat by radiation, the article is inserted in a protective muffle or tube, which may consist of any material of a highly refractory character, and which is a poor conductor of heat. The articles may be arranged either in a horizontal or a vertical position for the passage of the current therethrough, depending largely upon the character or form of the article.

In the manner above described, tubes, crucibles, blocks, muffles, etc., of fused metallic oxide may be expeditiously and economically produced. While I preferably use zirconiumoxide, it is also possible to utilize for the production of such articles, the oxides of thorium, tantalum, etc. Articles so formed have a very high refractory and chemical resisting quality, and in general can be suddenly heated to a very high temperature without crackling or scaling.

In the foregoing description I have made reference to several different articles which may be formed from the fused metallic oxide in the manner described, but it is to be understood that various other articles to be employed for numerous purposes, might also be produced in a similar manner. It is accordingly to be understood that while I have herein disclosed one desirable and practical mode of practicing my invention, the same is nevertheless susceptible of certain modifications, and I, therefore, reserve the privilege of adopting such legitimate changes as may be fairly comprehended within the spirit and scope of the invention as claimed.

I claim:

1. The process of producing articles of fused zirconium oxide which consists in first grinding the oxide to finely comminuted form, then adding a suitable binder to a predetermined quantity of the ground oxide, molding the oxide to a desired shape, arranging the molded article between spaced electrical conductors, heating the article to a dull red heat, and then passing an electric current through the article between the conductors of sufficiently high voltage and amperage to heat the article by resistance to a temperature of approximately above 2500° C., whereby the particles of oxide become fused together.

2. The process of producing articles of fused zirconium oxide which consists in first grinding the oxide to a finely comminuted form, then adding a suitable binder to a predetermined quantity of the ground oxide, molding the oxide to a desired shape, arranging the molded article between spaced carbon electrodes, heating the article to a dull red heat, and then passing an electric current through the article between the conductors of sufficiently high voltage and amperage to heat the article by resistance to a temperature of approximately above 2500° C., whereby the particles of oxide become fused together.

In testimony that I claim the foregoing as my invention, I have signed my name herein.

ALEXANDER L. DUVAL d'ADRIAN.